United States Patent
Sakurai

(10) Patent No.: US 9,908,999 B2
(45) Date of Patent: Mar. 6, 2018

(54) RUBBER TIRE-TREAD COMPOSITION AND PASSENGER-VEHICLE PNEUMATIC TIRE USING SAME

(71) Applicant: BRIDGESTONE CORPORATION, Tokyo (JP)

(72) Inventor: Hideyuki Sakurai, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/313,588

(22) PCT Filed: May 29, 2015

(86) PCT No.: PCT/JP2015/065694
§ 371 (c)(1),
(2) Date: Nov. 23, 2016

(87) PCT Pub. No.: WO2015/182779
PCT Pub. Date: Dec. 3, 2015

(65) Prior Publication Data
US 2017/0198121 A1    Jul. 13, 2017

(30) Foreign Application Priority Data
May 29, 2014    (JP) ................ 2014-111296

(51) Int. Cl.
*C08L 9/00* (2006.01)
*B60C 1/00* (2006.01)
*C08L 7/00* (2006.01)

(52) U.S. Cl.
CPC .............. *C08L 9/00* (2013.01); *B60C 1/0016* (2013.01); *C08L 7/00* (2013.01); *C08L 2205/02* (2013.01); *C08L 2205/03* (2013.01); *C08L 2205/035* (2013.01)

(58) Field of Classification Search
CPC ........................................ C08L 9/00
USPC ........................................ 523/156
See application file for complete search history.

(56) References Cited

U.S. PATENT DOCUMENTS

| | | | | |
|---|---|---|---|---|
| 4,111,867 A | * | 9/1978 | Komuro | B60C 1/0016 524/496 |
| 2005/0209390 A1 | * | 9/2005 | Yagi | B60C 1/0016 524/493 |
| 2009/0218024 A1 | | 9/2009 | Tsou et al. | |
| 2010/0113703 A1 | * | 5/2010 | Houjo | B60C 1/0016 525/232 |
| 2013/0014880 A1 | | 1/2013 | Tsou et al. | |
| 2014/0102611 A1 | | 4/2014 | Miyazaki | |

FOREIGN PATENT DOCUMENTS

| | | |
|---|---|---|
| CN | 101589100 A | 11/2009 |
| CN | 103764745 A | 4/2014 |
| JP | 59-074135 A | 4/1984 |
| JP | 2006-249230 A | 9/2006 |
| JP | 2007-099868 A | 4/2007 |
| JP | 2009-235274 A | 10/2009 |
| JP | 2009-256540 A | 11/2009 |
| JP | 2010-285112 A | 12/2010 |
| JP | 2011-68754 A | 4/2011 |
| JP | 2013-177113 A | 9/2013 |
| JP | 2014-009300 A | 1/2014 |
| WO | 2008/084860 A1 | 7/2008 |

OTHER PUBLICATIONS

Communication dated May 15, 2017 from the European Patent Office in counterpart application No. 15799783.4.
International Search Report for PCT/JP2015/065694 dated Jun. 30, 2015.

* cited by examiner

*Primary Examiner* — Doris L Lee
(74) *Attorney, Agent, or Firm* — Sughrue Mion, PLLC

(57) ABSTRACT

There is provided a rubber tire-tread composition comprising (A) a rubber component comprising 45% by mass or higher of one or more isoprene-based rubbers selected from the group consisting of natural rubbers and synthetic isoprene rubbers, and (B) one or more C5/C9-based petroleum resins selected from the group consisting of aromatic-modified aliphatic petroleum resins and aliphatic-modified aromatic petroleum resins in an amount of 5 to 50 parts by mass, and (C) a fatty acid metal salt in an amount of 0.5 to 10 parts by mass of, both based on 100 parts by mass of the rubber component.

7 Claims, No Drawings

RUBBER TIRE-TREAD COMPOSITION AND PASSENGER-VEHICLE PNEUMATIC TIRE USING SAME

CROSS REFERENCE TO RELATED APPLICATIONS

This application is a National Stage of International Application No. PCT/JP2015/065694 filed May 29, 2015, claiming priority based on Japanese Patent Application No. 2014-111296 filed May 29, 2014, the contents of all of which are incorporated herein by reference in their entirety.

TECHNICAL FIELD

The present invention relates to a rubber tire-tread composition and a pneumatic tire, particularly a passenger-vehicle pneumatic tire using the same.

BACKGROUND ART

There is conventionally a technology of improving the performance of a tire on both the ice and snow road surface and the wet road surface by using, for a tread rubber, a rubber composition having a content of a natural rubber and/or a synthetic polyisoprene rubber at a certain value or more in its rubber component and having a specific amount of a C5-based resin blended therein (PTL 1).

The technology, however, does not consider the durability of the tire on the bad road surface.

CITATION LIST

Patent Literature

PTL1: JP 2009-256540 A

SUMMARY OF INVENTION

Technical Problem

The present invention has been achieved under such a situation, and has an object to provide a rubber composition capable of largely improving the bad road durability of a pneumatic tire, and a pneumatic tire, particularly passenger-vehicle pneumatic tire, using the same.

Solution to Problem

As a result of exhaustive studies to solve the above-mentioned problem, the present inventor has found that there can be obtained a rubber composition capable of solving the problem, by blending a rubber component comprising not less than a certain amount of a natural rubber and/or a synthetic isoprene rubber with predetermined amounts of a specific resin and fatty acid metal salt. The present invention has been completed based on this finding.

That is, the present invention is to provide:

[1] a rubber tire-tread composition comprising (A) a rubber component comprising 45% by mass or higher of one or more isoprene-based rubbers selected from the group consisting of natural rubbers and synthetic isoprene rubbers, and (B) one or more C5/C9-based petroleum resins selected from the group consisting of aromatic-modified aliphatic petroleum resins and aliphatic-modified aromatic petroleum resins in an amount of 5 to 50 parts by mass, and (C) a fatty acid metal salt in an amount of 0.5 to 10 parts by mass, both based on 100 parts by mass of the rubber component; and

[2] a passenger-vehicle pneumatic tire using the rubber tire-tread composition according to the above [1] for its tread member.

Advantageous Effects of Invention

According to the present invention, there can be provided a rubber tire-tread composition capable of largely improving the bad road durability of a pneumatic tire, and a pneumatic tire, particularly, a passenger-vehicle pneumatic tire, using the same.

DESCRIPTION OF EMBODIMENTS

First, the rubber composition according to the present invention will be described.

[Rubber Composition]

The rubber composition according to the present invention comprises (A) a rubber component comprising 45% by mass or higher of one or more isoprene-based rubbers selected from the group consisting of natural rubbers and synthetic isoprene rubbers, and (B) one or more C5/C9-based petroleum resins selected from the group consisting of aromatic-modified aliphatic petroleum resins and aliphatic-modified aromatic petroleum resins in an amount of 5 to 50 parts by mass, and (C) a fatty acid metal salt in an amount of 0.5 to 10 parts by mass, both based on 100 parts by mass of the rubber component.

[(A) Rubber Component]

In the rubber composition according to the present invention, as the (A) rubber component, there is used a rubber component comprising 45% by mass or higher of one or more isoprene-based rubbers selected from the group consisting of natural rubbers and synthetic isoprene rubbers.

The natural rubber and the synthetic isoprene rubber are not especially limited, and can suitably be selected from conventionally well-known ones. The synthetic isoprene rubber is preferably one having a weight-average molecular weight of $4 \times 10^5$ or higher and a cis-bond content of 95% or higher. The weight-average molecular weight is a value in terms of standard polystyrenes measured by gel permeation chromatography (GPC).

In the present invention, the content of one or more isoprene-based rubbers selected from the group consisting of natural rubbers and synthetic isoprene rubbers in the (A) rubber component is, from the viewpoint of providing a rubber composition capable of exhibiting good low-temperature characteristics and well balanced wet grip performance and dry grip performance, necessarily 45% by mass or higher, preferably 70 to 100% by mass, more preferably 80 to 100% by mass, still more preferably 90 to 100% by mass, and especially preferably 100% by mass.

Further, in the (A) rubber component, in addition to the above isoprene-based rubber, as required, there can be concurrently used rubber components other than the above isoprene-based rubber in a proportion of 55% by mass or lower, preferably 30 to 0% by mass, more preferably 20 to 0% by mass, and still more preferably 10 to 0% by mass. The other rubber components are preferably synthetic diene-based rubbers other than the synthetic isoprene rubbers, and suitably includes, for example, one or more synthetic diene-based rubbers selected from the group consisting of polybutadiene rubbers, styrene-butadiene copolymer rubbers, ethylene-propylene-diene terpolymer rubbers, acrylonitrilebutadiene copolymer rubbers, chloroprene rubbers and mixtures thereof. Further, a part thereof may be modified diene-based rubbers obtained by using a modifying agent, for example, tin tetrachloride, silicon tetrachloride or an alkoxysilane compound.

In the (A) rubber component, the styrene-butadiene copolymer rubber accounts for, from the viewpoint of improving the bad road durability of the pneumatic tire, preferably 1 to 40% by mass, more preferably 1 to 30% by mass, still more preferably 1 to 10% by mass, and further still more preferably 1 to 5% by mass in the (A) rubber component.

[(B) Resin]

In the rubber composition according to the present invention, the (B) C5/C9-based petroleum resin is one or more petroleum resins selected from the group consisting of aromatic-modified aliphatic petroleum resins and aliphatic-modified aromatic petroleum resins.

The C5/C9-based petroleum resin is a solid polymer obtained by polymerizing C5 to C11 fractions originated from petroleums, and depending on the ingredient ratios, include aromatic-modified aliphatic petroleum resins and aliphatic-modified aromatic petroleum resins.

The aromatic-modified aliphatic petroleum resins refer to C5/C9-based petroleum resins having more aliphatic fractions than aromatic fractions in C5 to C11 fractions in terms of mass. Then, the aliphatic-modified aromatic petroleum resins refer to C5/C9-based petroleum resins having more aromatic fractions than aliphatic fractions or having the same amounts of aliphatic fractions and aromatic fractions, in C5 to C11 fractions, in terms of mass.

In the present invention, alicyclic compounds are included in aliphatic compounds. Therefore, alicyclic fractions composed of alicyclic compounds are included in aliphatic fractions.

In the rubber composition according to the present invention, the (B) C5/C9-based petroleum resin may be used singly or in a combination of two or more. Further the content is necessarily 5 to 50 parts by mass based on 100 parts by mass of the above-mentioned (A) rubber component. When the content is lower than 5 parts by mass, there cannot be attained the object of the present invention; and when exceeding 50 parts by mass, the processability is reduced. Therefore, the content of the resin is preferably in the range of 21 to 50 parts by mass, more preferably 25 to 50 parts by mass, and still more preferably 30 to 50 parts by mass, based on 100 parts by mass of the above-mentioned (A) rubber component.

In the present invention, by using the (B) C5/C9-based petroleum resin in the above amount, there can be obtained a rubber composition capable of improving the bad road durability of the pneumatic tire.

On the other hand, from the viewpoint of improving the wear resistance and the rolling resistance, the (B) C5/C9-based petroleum resin is preferably 10 to 20 parts by mass based on 100 parts by mass of the above-mentioned (A) rubber component.

[(C) Fatty Acid Metal Salt]

In the rubber composition according to the present invention, a fatty acid to be used for the (C) fatty acid metal salt includes fatty acids having a saturated or unsaturated, linear, branched or cyclic structure having 4 to 30 carbon atoms, or mixtures thereof. Among these, preferable are saturated or unsaturated, linear fatty acids having 10 to 22 carbon atoms. The saturated linear fatty acids having 10 to 22 carbon atoms include capric acid, lauric acid, myristic acid, pentadecylic acid, palmitic acid, margaric acid, stearic acid and arachidic acid. The unsaturated linear fatty acids having 10 to 22 carbon atoms include undecylenic acid, oleic acid, elaidic acid, cetoleic acid, erucic acid, brassidic acid, linoleic acid, linolenic acid and arachidonic acid.

A metal to be included in a fatty acid metal salt includes at least one metal selected from the group consisting of Zn, K, Ca, Na, Mg, Co, Ni, Ba, Fe, Al, Cu and Mn, and is especially preferably Zn.

In the rubber composition according to the present invention, as required, a reinforcing filler can further be blended as a (D) ingredient.

[(D) Reinforcing Filler]

As a (D) reinforcing filler, there is preferably used one or more reinforcing fillers selected from the group consisting of carbon black and silica.

The carbon black is not especially limited, and can be used by suitably selecting any one from those conventionally used as reinforcing fillers of rubbers. There are used, for example, SRF, GPF, FEF, HAF, ISAF and SAF, and preferable are HAF, ISAF and SAF, which are excellent particularly in the wear resistance.

The carbon black may be used singly or in a combination of two or more.

On the other hand, the silica includes, for example, wet silica (hydrous silicic acid), dry silica (anhydrous silicic acid), calcium silicate and aluminum silicate, but among these, wet silica is preferable.

The BET specific surface area (measured according to ISO 5794/1) of the wet silica is preferably 40 to 350 $m^2/g$. A silica having a BET specific surface area in this range has an advantage of being capable of simultaneously satisfying the rubber reinforcement and the dispersibility in the rubber component. From this viewpoint, a silica having a BET specific surface area in the range of 80 to 300 $m^2/g$ is further preferable. As such a silica, there can be used commercially available products such as "Nipsil AQ" and "Nipsil KQ", manufactured by Tosoh Silica Corp., and "Ultrasil VN3", manufactured by Degussa GmbH.

The silica may be used singly or in a combination of two or more.

In the rubber composition according to the present invention, the content of one or more reinforcing fillers selected from the group consisting of carbon black and silica is, based on 100 parts by mass of the (A) rubber component, preferably 20 to 120 parts by mass, and more preferably 35 to 100 parts by mass. When the content of the reinforcing fillers is 20 parts by mass or higher, the reinforcing effect is exhibited; and on the other hand, when being 120 parts by mass or lower, the rolling resistance never becomes too large.

The mass percent of the silica is, based on 100% by mass of the above-mentioned reinforcing fillers, from the viewpoint of improving the wet grip performance, preferably 50% by mass or higher, more preferably 70% by mass or higher, and still more preferably 90% by mass or higher.

(A Silane Coupling Agent)

In the rubber composition according to the present invention, in the case of using a silica as the reinforcing filler, for the purpose of further improving its reinforcement, a silane coupling agent can be blended.

Examples of the silane coupling agent include bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N, N-dimethylthiocarbamoyl tetrasulfide, 3-triethoxysilylpropyl-N, N-dimethylthiocarbamoyl tetrasulfide, 2-triethoxysilylethyl-N, N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N, N-dimethylthiocarbamoyl tetrasulfide and dimethoxymethylsilylpropylbenzothiazolyl tetrasulfide, but from the viewpoint of the reinforcement improving effect and the like, suitable are bis(3-triethoxysilylpropyl) polysulfide and 3-trimethoxysilylpropylbenzothiazolyl tetrasulfide.

These silane coupling agents may be used singly or in a combination of two or more.

In the rubber composition according to the present invention, a preferable blend amount of a silane coupling agent is, though depending on the kind and the like of the silane coupling agent, preferably selected in the range of 2 to 20 parts by mass based on 100 parts by mass of silica. When the amount is smaller than 2 parts by mass, the effect as a coupling agent is not sufficiently exhibited; and when exceeding 20 parts by mass, there arises a risk of causing the gelation of the rubber component. From the viewpoint of the effect as a coupling agent, the prevention of the gelation, and the like, the blend amount of the silane coupling agent is in the range of 5 to 15 parts by mass based on 100 parts by mass of silica.

(Action)

In the rubber composition according to the present invention, by using, as the (A) rubber component, a rubber component comprising 45% by mass or higher of one or more isoprene-based rubbers selected from the group consisting of natural rubbers and synthetic isoprene rubbers, low-temperature characteristics caused by the lowness of Tg thereof can be secured. By blending the (A) rubber component further with a (B) C5/C9-based petroleum resin and a fatty acid metal salt, the toughness of a vulcanized rubber composition after thermal degradation is made high and there can be obtained a rubber composition capable of largely improving the bad road durability of the pneumatic tire.

Here, the toughness (TF) is an integrated value of a stress-strain curve until a test piece is broken as measured according to JIS K6251:2010.

(Preparation of the Rubber Composition)

In the rubber composition according to the present invention, as required, there can be incorporated various types of chemicals usually used in rubber industries, for example, a vulcanizing agent, a vulcanization accelerator, an antioxidant, an antiscorching agent, zinc white and stearic acid, in the ranges of not impairing the object of the present invention.

The vulcanizing agent includes sulfur; and the use amount thereof is, based on 100 parts by mass of the rubber component, preferably 0.1 to 10.0 parts by mass as a sulfur content, and more preferably 1.0 to 5.0 parts by mass. When the amount is smaller than 0.1 part by mass, there arises a risk of lowering the breaking strength, the wear resistance and the low-heat build-up property; and when exceeding 10.0 parts by mass, it causes the rubber elasticity to be lost.

The vulcanization accelerator usable in the present invention is not especially limited, but examples thereof include thiazoles such as M (2-mercaptobenzothiazole), DM (dibenzothiazolyl disulfide) and CZ (N-cyclohexyl-2-benzothiazolylsulfenamide), or guanidines such as DPG (1,3-diphenylguanidine); and the use amount thereof is, based on 100 parts by mass of the rubber component, preferably 0.1 to 5.0 parts by mass, and more preferably 0.2 to 3.0 parts by mass.

Further, examples of the antioxidant usable in the rubber composition according to the present invention include 3C (N-isopropyl-N'-phenyl-p-phenylenediamine), 6C [N-(1,3-dimethylbutyl)-N'-phenyl-p-phenylenediamine], AW (6-ethoxy-2,2,4-trimethyl-1,2-dihydroquinoline) and high-temperature condensates of diphenylamine with acetone. The use amount thereof is, based on 100 parts by mass of the rubber matrix, preferably 0.1 to 6.0 parts by mass, and more preferably 0.3 to 5.0 parts by mass.

The rubber composition according to the present invention can be prepared by kneading each of the above-mentioned ingredient by using a kneading machine such as a Banbury mixer, a roll or an internal mixer.

The rubber composition according to the present invention thus prepared, since being capable of largely improving the bad road durability of the pneumatic tire, is suitably used as a tread member of the pneumatic tire.

[Pneumatic Tire]

The pneumatic tire, particularly the passenger-vehicle pneumatic tire, according to the present invention uses the above-mentioned rubber composition according to the present invention for its tread member.

The pneumatic tire, particularly the passenger-vehicle pneumatic tire, according to the present invention is manufactured by a usual method. That is, the rubber composition according to the present invention incorporating various types of chemicals as described above as required is extruded into a tread member, in an unvulcanized stage of the rubber composition, and applied on a tire-building machine by a usual method to thereby form a green tire. The green tire is heated and pressurized in a vulcanizing machine to thereby obtain a tire.

As a gas to be filled in a tire, there can be used usual air or an air whose oxygen partial pressure is varied, or an inert gas such as nitrogen.

EXAMPLES

Then, the present invention will be described in more detail by way of Examples, but the present invention is not any more limited to these Examples. Here, various measurement and evaluation methods were carried out according to the following methods.

(1) A Toughness (Index) after Thermal Degradation

A test piece was fabricated with a cutting blade of DIN-53504 type S3A from a rubber sample cut out with a slicer at a predetermined position from 1 mm in depth to 2 mm in depth from a surface layer of the tread of each pneumatic tire thermally degraded in a large-size gear oven (in air) under the thermal degradation condition of at 100° C. and for 48 hours, and measured for a toughness (TF) represented by an integrated value of a stress-strain curve until the test piece was broken, and evaluated for a toughness after thermal degradation by the following formulas. The higher the index value of the toughness, the better the bad road durability.

Toughness index after thermal degradation=[{a toughness (TF) of a tread rubber composition of a pneumatic tire of each of Examples 1, 2, 3, 8 to 11, Comparative Examples 2, or 3, 10 and 11 after thermal degradation}/{a toughness (TF) of a tread rubber composition of a pneumatic tire of Comparative Example 1 after thermal degradation}]×100

Toughness index after thermal degradation=[{a toughness (TF) of a tread rubber composition of a pneumatic tire of Comparative Example 4 after thermal degradation}/{a toughness (TF) of a tread rubber composition of a pneumatic tire of Comparative Example 5 after thermal degradation}]×100

Toughness index after thermal degradation=[{a toughness (TF) of a tread rubber composition of a pneumatic tire of Example 4 after thermal degradation}/{a toughness (TF) of a tread rubber composition of a pneumatic tire of Comparative Example 6 after thermal degradation}]×100

Toughness index after thermal degradation=[{a toughness (TF) of a tread rubber composition of a pneumatic tire of Example 5 after thermal degradation}/{a toughness (TF) of a tread rubber composition of a pneumatic tire of Comparative Example 7 after thermal degradation}]×100

Toughness index after thermal degradation=[{a toughness (TF) of a tread rubber composition of a pneumatic tire of Examples 6, 12, 13 after thermal degradation}/{a toughness (TF) of a tread rubber composition of a pneumatic tire of Comparative Example 8 after thermal degradation}]×100

Toughness index after thermal degradation=[{a toughness (TF) of a tread rubber composition of a pneumatic tire of Example 7 after thermal degradation}/{a toughness (TF) of a tread rubber composition of a pneumatic tire of Comparative Example 9 after thermal degradation}]×100

Toughness index after thermal degradation=[{a toughness (TF) of a tread rubber composition of a pneumatic tire of Example 14 after thermal degradation}/{a toughness (TF) of a tread rubber composition of a pneumatic tire of Comparative Example 12 after thermal degradation}]×100

Toughness index after thermal degradation=[{a toughness (TF) of a tread rubber composition of a pneumatic tire of Example 15 after thermal degradation}/{a toughness (TF) of a tread rubber composition of a pneumatic tire of Comparative Example 13 after thermal degradation}]×100

Toughness index after thermal degradation=[{a toughness (TF) of a tread rubber composition of a pneumatic tire of Example 16 after thermal degradation}/{a toughness (TF) of a tread rubber composition of a pneumatic tire of Comparative Example 14 after thermal degradation}]×100

As described above, the toughness index after thermal degradation was calculated by comparing toughnesses after thermal degradation of rubber compositions having the same mass ratio (natural rubber/polybutadiene rubber).

(2) Appearance Grading for the Bad Road Durability of Pneumatic Tires

A passenger-vehicle pneumatic radial tire of a tire size of 195/50R15 and a truck and bus pneumatic tire for test of a tire size of 245/70R19.5 using a rubber composition to be under test for their tread member were trially fabricated; an actual car test by bad road (gravel road) running was carried out; and for the pneumatic tires after the running, the bad road durability was evaluated in the following appearance grading of tread surfaces.

The "passenger vehicle tires" to be evaluated in Examples and Comparative Examples were tires having a tire size of 195/50R15 and a load index of 120 or lower.

Further the "truck and bus tires" (hereinafter, referred to also as "TB tire") to be evaluated in Examples and Comparative Examples were tires having a tire size of 245/70R19.5 and a load index of 134.

Here, the "load index" means an index to indicate a maximum load which one piece of tire can carry under a prescribed condition as provided by the "details of safety regulations for road vehicles has been promulgated under the authority of Road Vehicles Act" (as of Mar. 31, 2015) (technical standards of passenger-vehicle pneumatic tires). Further, a weight (load capability) which a tire can carry is prescribed for each size thereof by the standard, and the load carrying capability is indicated on the tire as an index called the load index (LI) (for example, http://tire.bridgestone.co.jp/about/tire-size/size-indication/index.html#anc01).

a: there were observed almost no cracks in a degree visible to the naked eye.
b: there were observed a few cracks in a degree visible to the naked eye.
c: there were a large number of cracks in a degree visible to the naked eye.

Examples 1 to 16 and Comparative Examples 1 to 14

Rubber compositions for Examples 1 to 16 and Comparative Examples 1 to 14 were prepared based on respective blend contents indicated in Tables 1 to 8. The each obtained rubber composition was used for treads, and according to a usual method, there were manufactured a passenger-vehicle pneumatic radial tire for test of a tire size of 195/50R15 and a truck and bus pneumatic tire for test of a tire size of 245/70R19.5. By using the obtained tires, there were evaluated the toughness (index) and the bad road durability index after thermal degradation. The evaluation results are shown in Table 1 to Table 8.

TABLE 1

|  |  | Example | | | Comparative Example | | | Comparative Example | | Example | | | |
|---|---|---|---|---|---|---|---|---|---|---|---|---|---|
|  |  | 1 | 2 | 3 | 1 | 2 | 3 | 10 | 11 | 8 | 9 | 10 | 11 |
| Blend Content (unit: parts by mass) | Natural Rubber *1 | 50 | 50 | 50 | 50 | 50 | 50 | 40 | 40 | 80 | 90 | 80 | 65 |
|  | Polybutadiene Rubber *2 | 50 | 50 | 50 | 50 | 50 | 50 | 20 | 20 | 15 | 5 | 5 | 5 |
|  | Styrene-Butadiene Rubber *14 | 0 | 0 | 0 | 0 | 0 | 0 | 40 | 40 | 5 | 5 | 15 | 30 |
|  | Carbon Black *3 | 5 | 5 | 5 | 5 | 5 | 5 | 52 | 52 | 5 | 5 | 5 | 5 |
|  | Silica *4 | 70 | 70 | 70 | 70 | 70 | 70 | 0 | 0 | 70 | 70 | 70 | 70 |
|  | Silane Coupling Agent *5 | 5.6 | 5.6 | 5.6 | 5.6 | 5.6 | 5.6 | 0 | 0 | 5.6 | 5.6 | 5.6 | 5.6 |
|  | C5/C9-Based Petroleum Resin *6 | 30 | 30 | 30 | 30 | 0 | 0 | 30 | 30 | 30 | 30 | 30 | 30 |
|  | Zinc Stearate *7 | 4 | 0 | 0 | 0 | 4 | 0 | 4 | 0 | 4 | 4 | 4 | 4 |
|  | Potassium Stearate *8 | 0 | 4 | 0 | 0 | 0 | 0 | 0 | 0 | 0 | 0 | 0 | 0 |
|  | Sodium Stearate *9 | 0 | 0 | 4 | 0 | 0 | 0 | 0 | 0 | 0 | 0 | 0 | 0 |
|  | Antioxidant *10 | 1 | 1 | 1 | 1 | 1 | 1 | 1 | 1 | 1 | 1 | 1 | 1 |
|  | Stearic Acid | 1 | 1 | 1 | 1 | 1 | 1 | 1 | 1 | 1 | 1 | 1 | 1 |
|  | Zinc Oxide | 2.5 | 2.5 | 2.5 | 2.5 | 2.5 | 2.5 | 2.5 | 2.5 | 2.5 | 2.5 | 2.5 | 2.5 |
|  | Vulcanization Accelerator DPG *11 | 0.8 | 0.8 | 0.8 | 0.8 | 0.8 | 0.8 | 0.8 | 0.8 | 0.8 | 0.8 | 0.8 | 0.8 |
|  | Vulcanization Accelerator CZ *12 | 1.1 | 1.1 | 1.1 | 1.1 | 1.1 | 1.1 | 1.1 | 1.1 | 1.1 | 1.1 | 1.1 | 1.1 |

TABLE 1-continued

|  | Example | | | Comparative Example | | | Comparative Example | | Example | | | |
| --- | --- | --- | --- | --- | --- | --- | --- | --- | --- | --- | --- | --- |
|  | 1 | 2 | 3 | 1 | 2 | 3 | 10 | 11 | 8 | 9 | 10 | 11 |
| Vulcanization Accelerator DM *13 | 1 | 1 | 1 | 1 | 1 | 1 | 1 | 1 | 1 | 1 | 1 | 1 |
| Sulfur | 1.9 | 1.9 | 1.9 | 1.9 | 1.9 | 1.9 | 1.9 | 1.9 | 1.9 | 1.9 | 1.9 | 1.9 |
| Kind of Tire | Passenger-vehicle pneumatic | | | Passenger-vehicle pneumatic | | | TB tire | | Passenger-vehicle pneumatic | | | |
| Toughness (Index) after Thermal Degradation | 125 | 120 | 119 | 100 | 87 | 81 | 60 | 55 | 140 | 145 | 123 | 105 |
| Appearance Grading of Bad Road Durability of Pneumatic Tire | a | a | a | c | c | c | c | c | a | a | a | a |

TABLE 2

|  |  | Comparative Example | |
| --- | --- | --- | --- |
|  |  | 4 | 5 |
| Blend Content (unit: parts by mass) | Natural Rubber *1 | 30 | 30 |
|  | Polybutadiene Rubber *2 | 70 | 70 |
|  | Carbon Black *3 | 5 | 5 |
|  | Silica *4 | 70 | 70 |
|  | Silane Coupling Agent *5 | 5.6 | 5.6 |
|  | C5/C9-Based Petroleum Resin *6 | 30 | 30 |
|  | Zinc Stearate *7 | 4 | 0 |
|  | Potassium Stearate *8 | 0 | 0 |
|  | Sodium Stearate *9 | 0 | 0 |
|  | Antioxidant *10 | 1 | 1 |
|  | Stearic Acid | 1 | 1 |
|  | Zinc Oxide | 2.5 | 2.5 |
|  | Vulcanization Accelerator DPG *11 | 0.8 | 0.8 |
|  | Vulcanization Accelerator CZ *12 | 1.1 | 1.1 |
|  | Vulcanization Accelerator DM *13 | 1 | 1 |
|  | Sulfur | 1.9 | 1.9 |
| Kind of Tire |  | Passenger-vehicle pneumatic tire | |
| Toughness (Index) after Thermal Degradation |  | 118 | 100 |
| Appearance Grading of Bad Road Durability of Pneumatic Tire |  | c | c |

TABLE 3

|  |  | Example 4 | Comparative Example 6 |
| --- | --- | --- | --- |
| Blend Content (unit: parts by mass) | Natural Rubber *1 | 60 | 60 |
|  | Polybutadiene Rubber *2 | 40 | 40 |
|  | Carbon Black *3 | 5 | 5 |
|  | Silica *4 | 70 | 70 |
|  | Silane Coupling Agent *5 | 5.6 | 5.6 |
|  | C5/C9-Based Petroleum Resin *6 | 30 | 30 |
|  | Zinc Stearate *7 | 4 | 0 |
|  | Potassium Stearate *8 | 0 | 0 |
|  | Sodium Stearate *9 | 0 | 0 |
|  | Antioxidant *10 | 1 | 1 |
|  | Stearic Acid | 1 | 1 |
|  | Zinc Oxide | 2.5 | 2.5 |
|  | Vulcanization Accelerator DPG *11 | 0.8 | 0.8 |
|  | Vulcanization Accelerator CZ *12 | 1.1 | 1.1 |
|  | Vulcanization Accelerator DM *13 | 1 | 1 |
|  | Sulfur | 1.9 | 1.9 |
| Kind of Tire |  | Passenger-vehicle pneumatic tire | |
| Toughness (Index) after Thermal Degradation |  | 129 | 100 |
| Appearance Grading of Bad Road Durability of Pneumatic Tire |  | a | c |

TABLE 4

|  |  | Example 5 | Comparative Example 7 | Example 16 | Comparative Example 14 |
| --- | --- | --- | --- | --- | --- |
| Blend Content (unit: parts by mass) | Natural Rubber *1 | 70 | 70 | 70 | 70 |
|  | Polybutadiene Rubber *2 | 30 | 30 | 30 | 30 |
|  | Carbon Black *3 | 5 | 5 | 5 | 5 |
|  | Silica *4 | 70 | 70 | 70 | 70 |
|  | Silane Coupling Agent *5 | 5.6 | 5.6 | 5.6 | 5.6 |
|  | C5/C9-Based Petroleum Resin *6 | 30 | 30 | 30 | 30 |
|  | Zinc Stearate *7 | 0 | 0 | 0 | 0 |
|  | Potassium Stearate *8 | 4 | 0 | 4 | 0 |
|  | Sodium Stearate *9 | 0 | 0 | 0 | 0 |
|  | Antioxidant *10 | 1 | 1 | 1 | 1 |
|  | Stearic Acid | 1 | 1 | 1 | 1 |
|  | Zinc Oxide | 2.5 | 2.5 | 2.5 | 2.5 |
|  | Vulcanization Accelerator DPG *11 | 0.8 | 0.8 | 0.8 | 0.8 |
|  | Vulcanization Accelerator CZ *12 | 1.1 | 1.1 | 1.1 | 1.1 |
|  | Vulcanization Accelerator DM *13 | 1 | 1 | 1 | 1 |
|  | Sulfur | 1.9 | 1.9 | 1.9 | 1.9 |
| Kind of Tire |  | Passenger-vehicle pneumatic tire | | TB tire | |
| Toughness (Index) after Thermal Degradation |  | 135 | 100 | 134 | 100 |
| Appearance Grading of Bad Road Durability of Pneumatic Tire |  | a | c | b | c |

TABLE 5

| | | Example | | | Comparative Example |
|---|---|---|---|---|---|
| | | 6 | 12 | 13 | 8 |
| Blend Content (unit: parts by mass) | Natural Rubber *1 | 80 | 80 | 80 | 80 |
| | Polybutadiene Rubber *2 | 20 | 20 | 20 | 20 |
| | Carbon Black *3 | 5 | 5 | 5 | 5 |
| | Silica *4 | 70 | 70 | 70 | 70 |
| | Silane Coupling Agent *5 | 6 | 6 | 6 | 6 |
| | C5/C9-Based Petroleum Resin *6 | 30 | 20 | 12 | 30 |
| | Zinc Stearate *7 | 4 | 4 | 4 | 0 |
| | Potassium Stearate *8 | 0 | 0 | 0 | 0 |
| | Sodium Stearate *9 | 0 | 0 | 0 | 0 |
| | Antioxidant *10 | 1 | 1 | 1 | 1 |
| | Stearic Acid | 1 | 1 | 1 | 1 |
| | Zinc Oxide | 2.5 | 2.5 | 2.5 | 2.5 |
| | Vulcanization Accelerator DPG *11 | 0.8 | 0.8 | 0.8 | 0.8 |
| | Vulcanization Accelerator CZ *12 | 1.1 | 1.1 | 1.1 | 1.1 |
| | Vulcanization Accelerator DM *13 | 1 | 1 | 1 | 1 |
| | Sulfur | 1.9 | 1.9 | 1.9 | 1.9 |
| Kind of Tire | | Passenger-vehicle pneumatic tire | | | |
| Toughness (Index) after Thermal Degradation | | 140 | 130 | 122 | 100 |
| Appearance Grading of Bad Road Durability of Pneumatic Tire | | a | a | a | c |

TABLE 6

| | | Example 7 | Comparative Example 9 |
|---|---|---|---|
| Blend Content (unit: parts by mass) | Natural Rubber *1 | 100 | 100 |
| | Polybutadiene Rubber *2 | 0 | 0 |
| | Carbon Black *3 | 5 | 5 |
| | Silica *4 | 70 | 70 |
| | Silane Coupling Agent *5 | 5.6 | 5.6 |
| | C5/C9-Based Petroleum Resin *6 | 30 | 30 |
| | Zinc Stearate *7 | 4 | 0 |
| | Potassium Stearate *8 | 0 | 0 |
| | Sodium Stearate *9 | 0 | 0 |
| | Antioxidant *10 | 1 | 1 |
| | Stearic Acid | 1 | 1 |
| | Zinc Oxide | 2.5 | 2.5 |
| | Vulcanization Accelerator DPG *11 | 0.8 | 0.8 |
| | Vulcanization Accelerator CZ *12 | 1.1 | 1.1 |
| | Vulcanization Accelerator DM *13 | 1 | 1 |
| | Sulfur | 1.9 | 1.9 |
| Kind of Tire | | Passenger-vehicle pneumatic tire | |
| Toughness (Index) after Thermal Degradation | | 143 | 100 |
| Appearance Grading of Bad Road Durability of Pneumatic Tire | | a | c |

TABLE 7

| | | Example 14 | Comparative Example 12 |
|---|---|---|---|
| Blend Content (unit: parts by mass) | Natural Rubber *1 | 80 | 80 |
| | Polybutadiene Rubber *2 | 20 | 20 |
| | Carbon Black *3 | 16 | 16 |
| | Silica *4 | 64 | 64 |
| | Silane Coupling Agent *5 | 5.6 | 5.6 |
| | C5/C9-Based Petroleum Resin *6 | 30 | 30 |
| | Zinc Stearate *7 | 4 | 0 |
| | Potassium Stearate *8 | 0 | 0 |
| | Sodium Stearate *9 | 0 | 0 |
| | Antioxidant *10 | 1 | 1 |
| | Stearic Acid | 1 | 1 |
| | Zinc Oxide | 2.5 | 2.5 |
| | Vulcanization Accelerator DPG *11 | 0.8 | 0.8 |
| | Vulcanization Accelerator CZ *12 | 1.1 | 1.1 |
| | Vulcanization Accelerator DM *13 | 1 | 1 |
| | Sulfur | 1.9 | 1.9 |
| Kind of Tire | | Passenger-vehicle pneumatic tire | |
| Toughness (Index) after Thermal Degradation | | 109 | 100 |
| Appearance Grading of Bad Road Durability of Pneumatic Tire | | a | b |

TABLE 8

| | | Example 15 | Comparative Example 13 |
|---|---|---|---|
| Blend Content (unit: parts by mass) | Natural Rubber *1 | 80 | 80 |
| | Polybutadiene Rubber *2 | 20 | 20 |
| | Carbon Black *3 | 32 | 32 |
| | Silica *4 | 48 | 48 |
| | Silane Coupling Agent *5 | 5.6 | 5.6 |
| | C5/C9-Based Petroleum Resin *6 | 30 | 30 |
| | Zinc Stearate *7 | 4 | 0 |
| | Potassium Stearate *8 | 0 | 0 |
| | Sodium Stearate *9 | 0 | 0 |
| | Antioxidant *10 | 1 | 1 |
| | Stearic Acid | 1 | 1 |
| | Zinc Oxide | 2.5 | 2.5 |
| | Vulcanization Accelerator DPG *11 | 0.8 | 0.8 |
| | Vulcanization Accelerator CZ *12 | 1.1 | 1.1 |
| | Vulcanization Accelerator DM *13 | 1 | 1 |
| | Sulfur | 1.9 | 1.9 |
| Kind of Tire | | Passenger-vehicle pneumatic tire | |

TABLE 8-continued

| | Example 15 | Comparative Example 13 |
|---|---|---|
| Toughness (Index) after Thermal Degradation | 107 | 100 |
| Appearance Grading of Bad Road Durability of Pneumatic Tire | a | b |

[Notes]
*1 to *14 are common to Table 1 and Table 2.
*1: natural rubber: "SIR20", produced in Indonesia
*2: polybutadiene rubber: trade name "BR01", manufactured by JSR Corp.
*3: carbon black: N220(ISAF), trade name "#80", manufactured by Asahi Carbon Co., Ltd.
*4: silica: trade name "Nipsil AQ" (BET specific surface area: 205 m$^2$/g), manufactured by Tosoh Silica Corp.
*5: silane coupling agent: bis(3-triethoxysilylpropyl) disulfide (average sulfur chain length: 2.35), trade name "Si75" (registered trademark), manufactured by Evonik Degussa GmbH
*6: C5/C9-based petroleum resin: trade name "Quintone (registered trademark) G100B", manufactured by Zeon Corp.
*7: zinc stearate: manufactured by Sigma-Aldrich Corp., product number "307564"
*8: potassium stearate: manufactured by Sigma-Aldrich Corp., product number "24-5570"
*9: sodium stearate: manufactured by Sigma-Aldrich Corp., product number "S3381"
*10: antioxidant: N-(1,3-dimethylbutyl)-N'-phenyl-p-phenylenediamine, trade name "Nocrac(registered trademark) 6C", manufactured by Ouchi Shinko Chemical Industrial Co., Ltd.
*11: vulcanization accelerator DPG: trade name "Soxinol (registered trademark) D-G", manufactured by Sumitomo Chemical Co., Ltd.
*12: vulcanization accelerator CZ: trade name "Nocceler (registered trademark) CZ-G", manufactured by Ouchi Shinko Chemical Industrial Co., Ltd.
*13: vulcanization accelerator DM: trade name "Nocceler (registered trademark) DM-P", manufactured by Ouchi Shinko Chemical Industrial Co., Ltd.
*14: styrene-butadiene rubber: trade name "JSR1500", manufactured by JSR Corp.

As is clear from Table 1 to 8, since the rubber compositions of Examples 1 to 7 contained a rubber component containing 45% by mass or higher of an isoprene-based rubber, together with the (B) C5/C9-based petroleum resin and a (C) fatty acid metal salt blended therein, the bad road durability of the pneumatic tires could be largely improved.

INDUSTRIAL APPLICABILITY

The rubber composition according to the present invention is, since being capable of largely improving the bad road durability of pneumatic tires, suitably used for tread members and the like of various types of pneumatic tires including passenger-vehicle (including light passenger-vehicle also), light truck, truck and bus, and off-the-road (construction-vehicle, mine-vehicle) tires, and suitably used particularly for tread members and the like of passenger-vehicle pneumatic tires.

The invention claimed is:

1. A rubber tire-tread composition comprising (A) a rubber component comprising 45% by mass or higher of one or more isoprene-based rubbers selected from the group consisting of natural rubbers and synthetic isoprene rubbers, and (B) one or more C5/C9-based petroleum resins selected from the group consisting of aromatic-modified aliphatic petroleum resins and aliphatic-modified aromatic petroleum resins in an amount of 5 to 50 parts by mass, and (C) a fatty acid metal salt in an amount of 0.5 to 10 parts by mass, both based on 100 parts by mass of the rubber component.

2. The rubber composition according to claim 1, wherein the (A) rubber component comprises the isoprene-based rubber in a proportion of 70 to 100% by mass.

3. The rubber composition according to claim 1, wherein the (A) rubber component comprises a styrene-butadiene copolymer rubber in a proportion of 1 to 30% by mass.

4. The rubber composition according to claim 1, further comprising a reinforcing filler, wherein the reinforcing filler comprises a silica in a proportion of 50% by mass or higher.

5. The rubber composition according to claim 1, wherein the (A) rubber component comprises 100% by mass of the isoprene-based rubber.

6. The rubber composition according to claim 1, wherein a content of the (B) C5/C9-based petroleum resins is 21 to 50 parts by mass based on 100 parts by mass of the (A) rubber component.

7. A passenger-vehicle pneumatic tire, wherein a rubber composition according to claim 1 is used for a tread member of the pneumatic tire.

* * * * *